April 13, 1937.　　J. D. RUST ET AL　　2,076,598
COTTON PICKING MACHINE
Filed April 22, 1935　　3 Sheets-Sheet 1
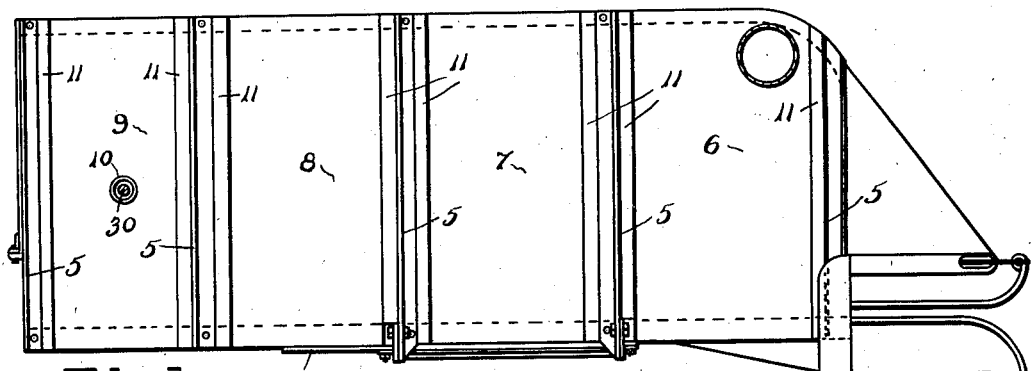
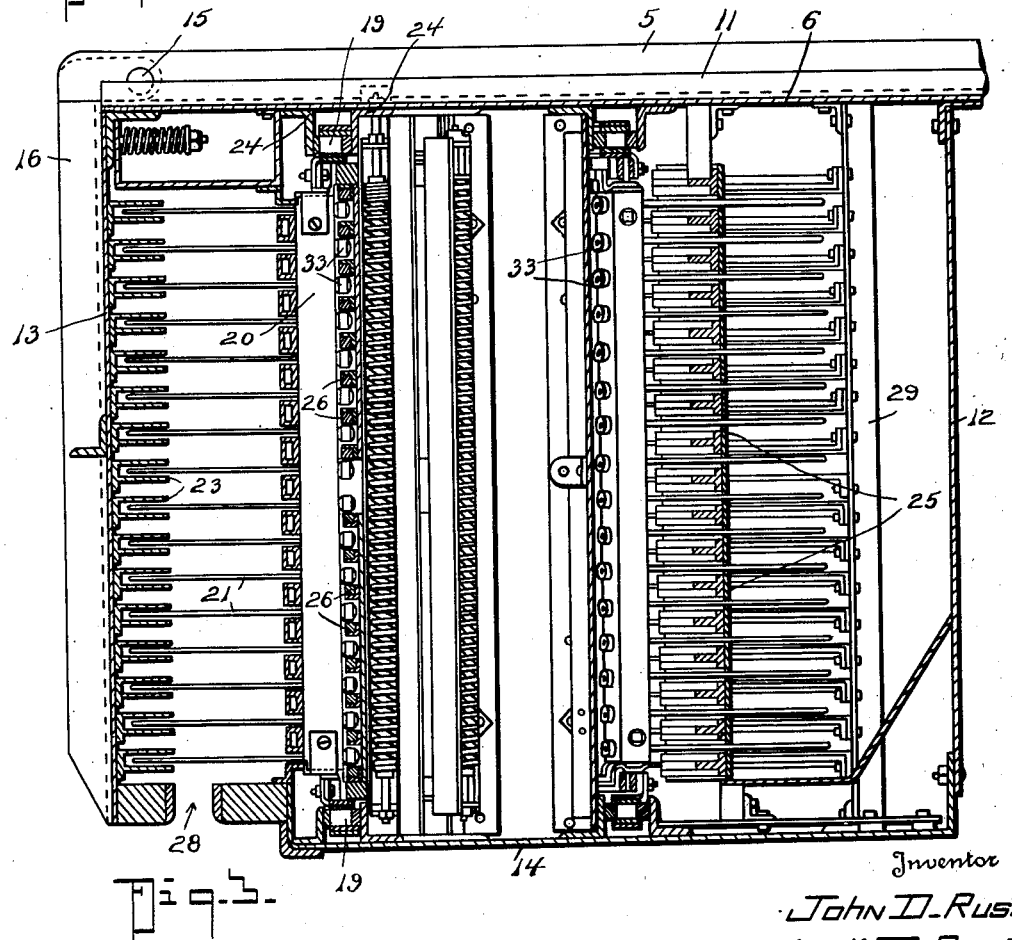
Inventor
John D. Rust
Mack D. Rust
By Albert E. Dieterich
Attorney

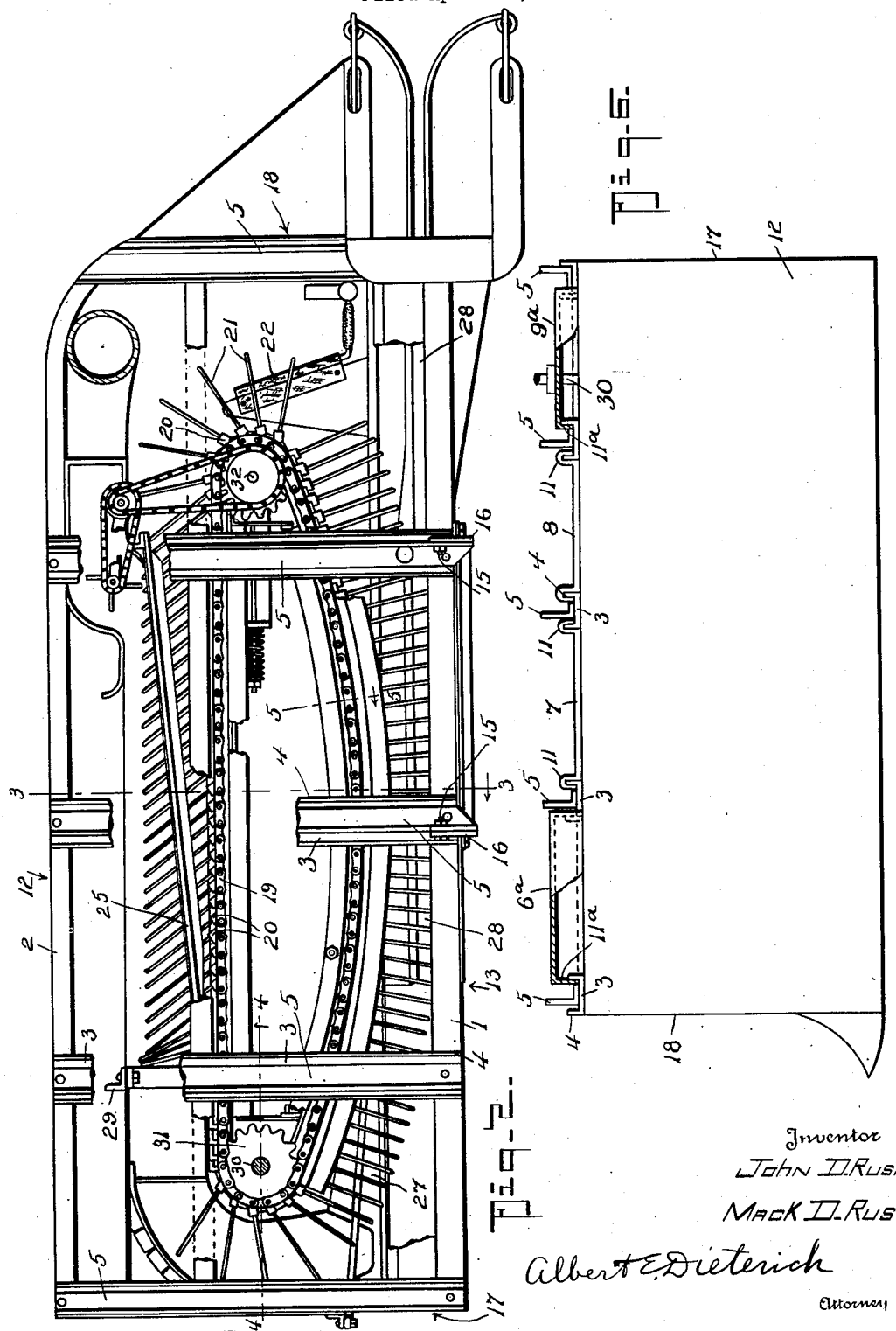

April 13, 1937.  J. D. RUST ET AL  2,076,598
COTTON PICKING MACHINE
Filed April 22, 1935   3 Sheets-Sheet 3

Inventor
John D. Rust
Mack D. Rust
By Albert E. Dieterich
Attorney

Patented Apr. 13, 1937

2,076,598

UNITED STATES PATENT OFFICE 2,076,598

COTTON PICKING MACHINE

John D. Rust and Mack D. Rust, Memphis, Tenn.

Application April 22, 1935, Serial No. 17,733

1 Claim. (Cl. 56—40)

The object of this invention is to provide certain new and useful improvements in the cotton picking machines of the type disclosed in our Letters Patent No. 1,894,198, issued January 10, 1933, and it especially has for its object to provide the picking mechanism with a rain-proof housing having quickly removable lids to enable one to have instant access to the interior of the housing should occasion require.

With the foregoing and other objects in mind, the invention consists in the novel construction and arrangement of the elements hereinafter disclosed, it being understood that modifications may be made within the scope of the appended claim without departing from the spirit of the invention.

Whereas in the present drawings the features of novelty over machines disclosed in the aforesaid Letters Patent No. 1,894,198 are emphasized, it will be understood that a main carrying structure including mounting means and driving means will be employed, as for instance the structure shown in Figure 1 in Letters Patent No. 1,894,198.

In the drawings:

Figure 1 is a plan view of a single row machine or a unit of a double row machine, with mounting means and conveyor driving means omitted.

Figure 2 is a plan view of the same with the cover plates removed, parts being broken away and other parts being shown in cross section.

Figure 3 is a vertical cross section on the line 3—3 of Figure 2.

Figure 6 is a side elevation of a portion of a cotton picker embodying the invention in a somewhat modified form, parts being shown broken away.

Figure 4:
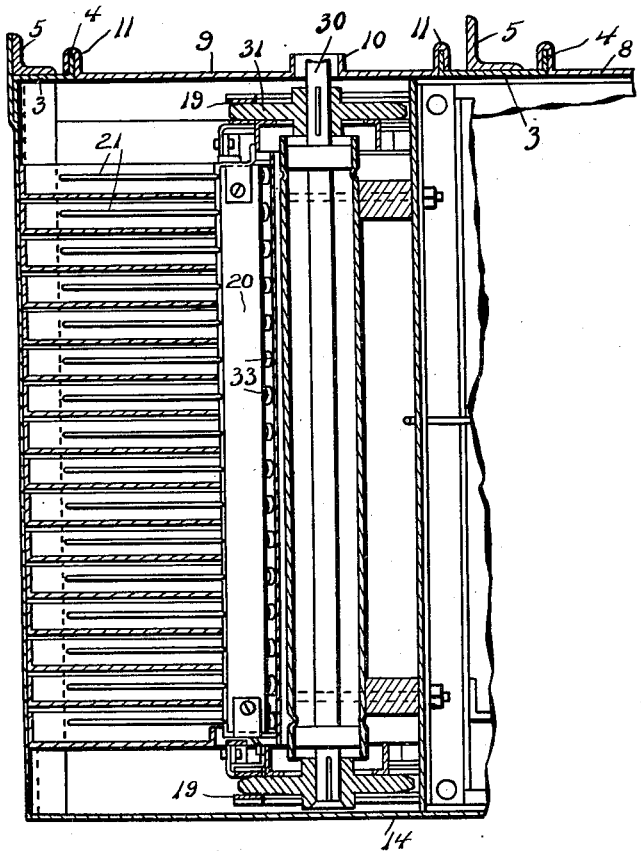
Figure 4 is a vertical cross section on the line 4—4 of Figure 2.
Figure 5:
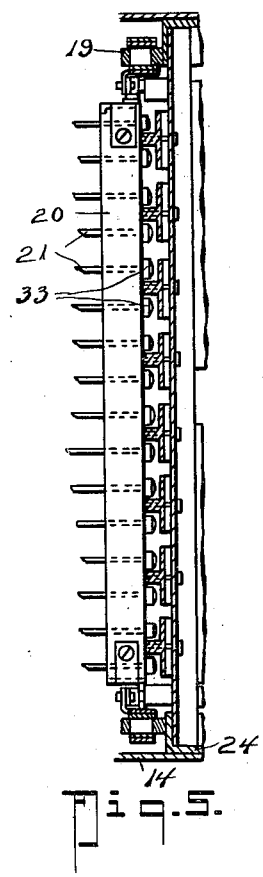
Figure 5 is a vertical section approximately on line 5—5 of Figure 2.

The present application is a continuation in part of our application Serial No. 723,423, filed May 1, 1934, which in turn is a substitute for our application Serial No. 531,812, filed April 12, 1931. The cotton picking mechanism per se, as well as the general structure of the housing herein disclosed in said application Serial No. 723,423, shown and described, may be the same as that. While we have shown a specific construction of stripping mechanism within the housing, yet we wish it understood that the housing may be employed with other specific stripping mechanisms and is not limited in use to the particular picking mechanism herein shown and described and illustrated in the accompanying drawings, save in so far as that mechanism is specifically set forth in the claim.

With the above clearly understood, reference is now made to the accompanying drawings in which like numerals and letters of reference indicate like parts in all of the figures. The housing includes a suitable framework composed of upper longitudinal angle bars 1 and 2 connected by transverse angle bars 5; vertical angle irons 16 and 29, and lower longitudinal angle bars 24 are also included as a part of the frame.

Secured to the cross angle bars 5 are channel plates 3 which have upstanding flanges 4. The plates 3 serve as transverse gutters to deflect rain-water to and over the sides of the housing. The plates also serve to sustain in part the quickly detachable or removable covers 6, 7, 8, and 9 respectively.

The cover 9 which is held over the rear portion of the machine, is provided with a hole for the passage of the conveyor drive shaft 30, and the hole is surrounded by a flange 10 which deflects water and prevents it from entering the hole. The several cover plates in the first embodiment of the invention, have inverted U-shaped flanges 11 to overlie and receive the flanges 4 of the channel plates 3.

The housing also comprises the side walls 12 and 13, the bottom 14, the rear wall 17, and the front wall 18. A portion of the side wall 13 which is carried by the angle irons 16 may be pivoted at 15 so as to be swung outwardly when desired.

The picking mechanism proper includes the upper and lower endless conveyor chains 19 which pass around suitable sprockets 31 on shafts 30 and 32 respectively. The chains 19 carry spindle-carrying slats 20 in which are rotatably mounted the smooth spindles 21 that are rotated by having their rollers 33 engage suitable tracks 26.

Before entering the plants the spindles are moistened by a suitable spindle moistening device 22. The swingable portion of the side wall 13 has plates or fins 33 between which the free ends of the spindles are passed in order to insure the full passage of the spindles into and through the plants and to insure that the cotton is gathered well up along the spindles.

Suitable stalk guides 27 are provided to restrain the plants against following the spindles as they leave the tunnel-way and pass to the stripping side of the machine where the cotton is removed from the spindles by suitable stripping devices 26. The passage-way for the plants—or tunnel-way, as it may be called—is located between and above the longitudinally extending floor elements 28.

The construction of the picking mechanism per se may, as before intimated, be of any suitable kind, as for example that disclosed in detail in our application Serial No. 723,423 aforesaid. The essential feature of this application resides in the providing of a rain-proof housing for a cotton picking mechanism of the general type disclosed.

In Figure 6 we have shown a somewhat modified construction of removable covers. In this embodiment of the invention the end covers 6a and 9a have simple flanges 11a to fit over the channel plate flanges 4. Other modifications may be made without departing from the spirit of the invention and the scope of the appended claim. All lids may be of the type of 6a and 9a, if desired. In either case the lids or covers, together with the channel plates 3, will serve as effective water sheds and will prevent rain from getting into the housing to damage the stripping mechanism or to interfere with the proper operation thereof. Were no rain-proof housing employed, the spindles in rainy weather might become too moist and thereby reduce the efficiency of the machine. This advantage of providing a rain-proof housing is in addition to the usual advantage obtained by preventing rain from getting at parts which ordinarily would rust under the influence of rain and moisture.

From the foregoing description, taken in connection with the accompanying drawings, it is thought that the construction and advantages of the invention will be clear to those skilled in the art.

What we claim is:

A cotton picking machine comprising a housing having side and end walls, the end walls having openings for the passage of plants into and out of the housing, said housing including transverse channel plates at the top spaced apart in the longitudinal direction of the machine and removable lids bridging the spaces between said channel plates and having flanges to overlie the flanges of the channel plates, said channel plates functioning as gutters to deflect water to and over the side walls of the machine, and a cotton picking mechanism located within the housing.

JOHN D. RUST.
MACK D. RUST.